United States Patent
Doing et al.

(10) Patent No.: US 9,715,411 B2
(45) Date of Patent: Jul. 25, 2017

(54) TECHNIQUES FOR MAPPING LOGICAL THREADS TO PHYSICAL THREADS IN A SIMULTANEOUS MULTITHREADING DATA PROCESSING SYSTEM

(71) Applicant: INTERNATIONAL BUSINESS MACHINES CORPORATION, Armonk, NY (US)

(72) Inventors: Richard William Doing, Raleigh, NC (US); Brian R. Konigsburg, Austin, TX (US); David Stephen Levitan, Austin, TX (US); Kevin Neal Magill, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/173,039

(22) Filed: Feb. 5, 2014

(65) Prior Publication Data
US 2015/0220366 A1 Aug. 6, 2015

(51) Int. Cl.
G06F 9/46 (2006.01)
G06F 9/50 (2006.01)

(52) U.S. Cl.
CPC .... G06F 9/5027 (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 7,669,203 B2 | 2/2010 | Samra et al. | |
| 7,797,683 B2 | 9/2010 | Hammarlund et al. | |
| 8,296,772 B2 | 10/2012 | Bulfin | |
| 8,484,648 B2 | 7/2013 | Divirgilio et al. | |
| 2007/0300227 A1* | 12/2007 | Mall et al. | 718/102 |
| 2008/0104296 A1* | 5/2008 | Blackmore et al. | 710/267 |
| 2011/0093638 A1* | 4/2011 | Divirgilio | G06F 9/3851 710/267 |
| 2011/0138152 A1* | 6/2011 | Ogura | G06F 9/30054 712/214 |
| 2011/0276784 A1* | 11/2011 | Gewirtz | G06F 9/3851 712/205 |
| 2011/0283095 A1* | 11/2011 | Hall | G06F 9/3009 712/228 |
| 2012/0246447 A1* | 9/2012 | Bishop et al. | 712/214 |

OTHER PUBLICATIONS

Wang et al., "Performance Analysis of Thread Mappings with a Holistic View of Hardware Resources," 2012 IEEE International Symposium on Performance Analysis of Systems and Software, Apr. 1-3, 2012, pp. 156-167, New Brunswick, NJ.

\* cited by examiner

*Primary Examiner* — Kenneth Tang
(74) *Attorney, Agent, or Firm* — Michael R. Long; Steven L. Bennett

(57) ABSTRACT

A technique for mapping logical threads to physical threads of a simultaneous multithreading (SMT) data processing system includes mapping one or more logical threads to one or more physical threads based on a selected SMT mode for a processor. In this case, respective resources for each of the one or more physical threads are predefined based on the SMT mode and an identifier of the one or more physical threads. The one or more physical threads are then executed on the processor utilizing the respective resources.

20 Claims, 5 Drawing Sheets

TECHNIQUES FOR MAPPING LOGICAL THREADS TO PHYSICAL THREADS IN A SIMULTANEOUS MULTITHREADING DATA PROCESSING SYSTEM

BACKGROUND

The disclosure generally relates to mapping logical threads to physical threads, and more particularly, to techniques for mapping logical threads to physical threads in a simultaneous multithreading data processing system.

In general, on-chip parallelism of a processor design may be increased through superscalar techniques that attempt to exploit instruction level parallelism (ILP) and/or through multithreading, which attempts to exploit thread level parallelism (TLP). Superscalar refers to executing multiple instructions at the same time, and multithreading refers to executing instructions from multiple threads within one processor chip at the same time. Simultaneous multithreading (SMT) is a technique for improving the overall efficiency of superscalar processors with hardware multithreading. In general, SMT permits multiple independent threads of execution to better utilize resources provided by modern processor architectures. In SMT, the pipeline stages are time shared between active threads.

In computer science, a thread of execution (or thread) is usually the smallest sequence of programmed instructions that can be managed independently by an operating system (OS) scheduler. A thread is usually considered a light-weight process, and the implementation of threads and processes usually differs between OSs, but in most cases a thread is included within a process. Multiple threads can exist within the same process and share resources, e.g., memory, while different processes usually do not share resources. In a processor with multiple processor cores, each processor core may execute a separate thread simultaneously. In general, a kernel of an OS allows programmers to manipulate threads via a system call interface.

BRIEF SUMMARY

A technique for mapping logical threads to physical threads of a simultaneous multithreading (SMT) data processing system includes mapping one or more logical threads to one or more physical threads based on a selected SMT mode for a processor. In this case, respective resources for each of the one or more physical threads are predefined based on the SMT mode and an identifier of the one or more physical threads. The one or more physical threads are then executed on the processor utilizing the respective resources.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
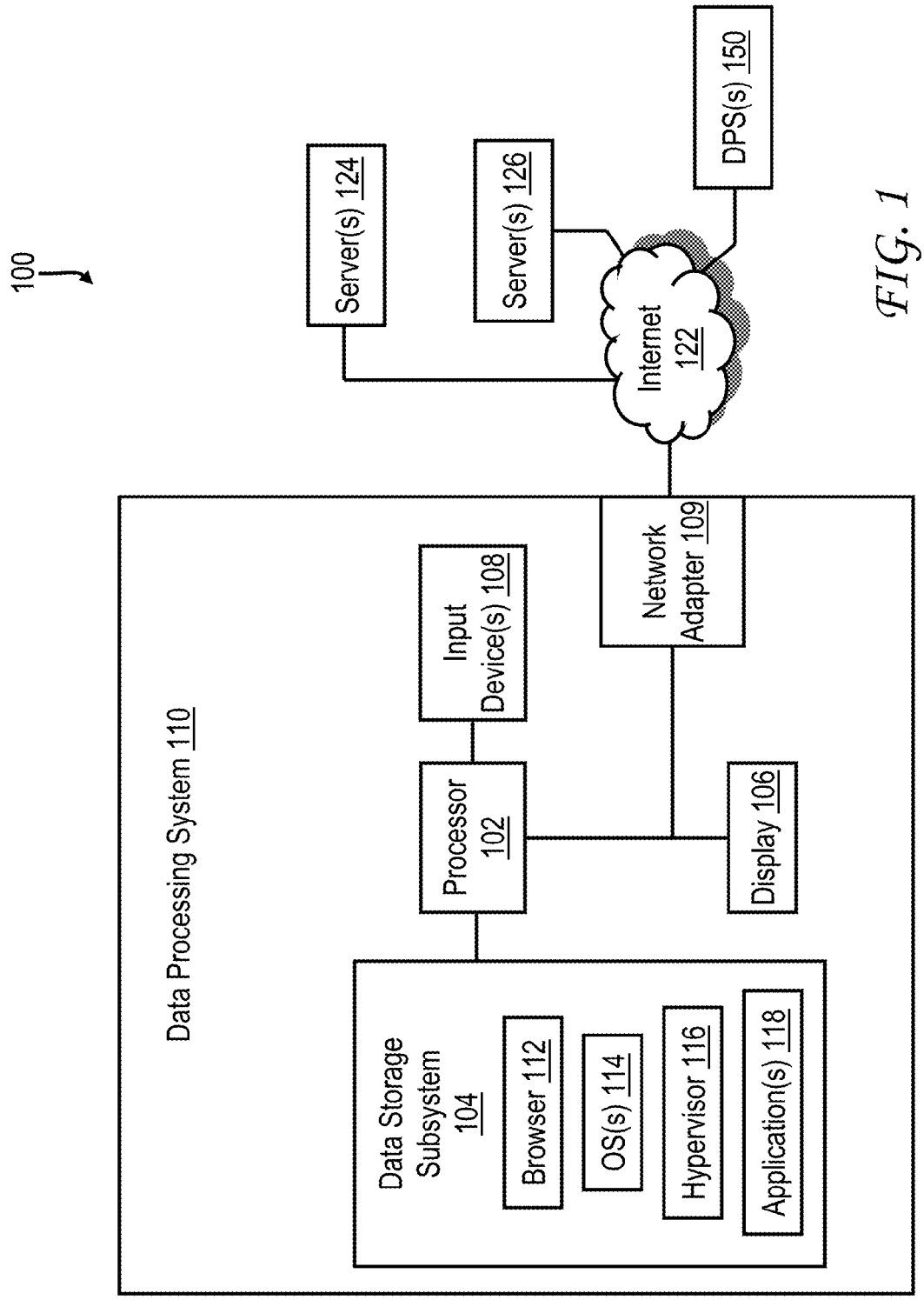
FIG. 1 is a diagram of a relevant portion of an exemplary data processing system environment that includes a simultaneous multithreading (SMT) data processing system that is configured to map logical threads to physical threads according to the present disclosure.

The illustrative embodiments provide a method, a data processing system, and a processor configured to map logical threads to physical threads in a simultaneous multithreading data processing system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

According to one or more embodiments of the present disclosure, each processor of a data processing system may be configured to execute two thread sets. As one example, a processor that includes eight processor cores may implement two thread sets that each include up to four threads, for a maximum of eight threads. According to another aspect of the present disclosure, a number of simultaneous multi-threading (SMT) modes are defined. In a first SMT (SMT1) mode only one thread is allowed. In a second SMT (SMT2) mode only one thread is allowed for each of two thread sets, for a total of two threads. In a third SMT (SMT4) mode two threads are allowed for each of two thread sets, for a total of four threads. In a fourth SMT (SMT8) mode four threads are allowed for each of two thread sets, for a total of eight threads. In various embodiments, certain resources (e.g., instruction buffers, effective address tables (EATs), and link stacks), e.g., located within an instruction fetch unit (IFU), are partitioned based on SMT mode. It should be appreciated that resources other than IFU resources may be partitioned based on SMT mode according to the present disclosure.

In various embodiments, threads can be dynamically added to and removed from a processor core. In at least one embodiment, a processor core can operate in single thread SMT1 mode and a logical thread may have a thread identifier (ID) from '0' to '7'. In SMT2 mode, any two threads can be allocated to each of the two thread sets. Conventionally a data structure, e.g., a look-up table (LUT), has been accessed to determine physical resources assigned to a logical thread. However, accessing a LUT to determine physical resources assigned to a logical thread is relatively cumbersome and may potentially cause timing problems.

According to one embodiment of the present disclosure, a logical-to-physical mapping is employed that maps (for the SMT1 mode) a first logical thread encountered to physical thread '0'. According to another embodiment of the present disclosure, a logical-to-physical mapping is employed that maps (for the SMT2 mode) a first logical thread encountered for thread set '0' to physical thread '0' and a first logical thread encountered for thread set '1' to physical thread '4'. When there are additional logical threads in thread set '0', the additional logical threads are assigned to physical thread '1', then physical thread '2', and finally physical thread '3' (when four logical threads are defined for thread set '0'). Similarly, when there are additional logical threads in thread set '1', the additional logical threads are assigned to physical thread '5', then physical thread '6', and finally physical thread '7' (when four logical threads are defined for thread set '1').

Figure 3:
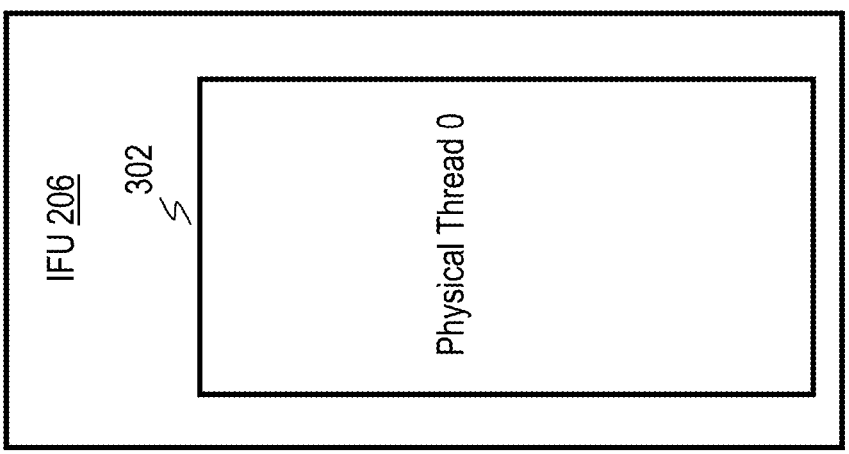
FIG. 3 is a diagram of a relevant portion of an instruction fetch unit (IFU) whose resources have been mapped for a first SMT (SMT1) mode that only includes a single logical thread mapped to a single physical thread according to an embodiment of the present disclosure.

According to one or more embodiments, in SMT1 mode resources are only assigned for physical thread '0' (see FIG. 3). In SMT2 mode, resources are only assigned for physical threads '0' and '4' (see FIG. 4). In SMT4 mode, resources are only assigned for physical threads '0', '1', '4', and '5' (see FIG. 5). In SMT8 mode, resources are assigned for physical threads '0', '1', '2', '3' of thread set '0' and physical threads '4', '5', '6', '7' of thread set '1' (see FIG. 6). In data processing systems that employ the above-described thread mapping, a thread identifier (ID) can be used to physically index processor core resources (e.g., instruction fetch unit (IFU) resources) that are statically partitioned based on an SMT mode.

It should be appreciated that other resource assignments may be employed in a data processing system configured according to the present disclosure. For example, in an alternate SMT1 mode resources may only be assigned for physical thread '0'. In an alternate SMT2 mode resources may only be assigned for physical threads '0' and '2'. In the alternate SMT2 mode, physical thread '0' may be assigned to thread set '0', and physical thread '2' may be assigned to thread set '1'. In an alternate SMT4 mode resources may only be assigned for physical threads '0', '2', '4', and '6'. In the alternate SMT4 mode, physical threads '0' and '4' may be assigned to thread set '0', and physical threads '2' and '6' may be assigned to thread set '1'. Finally, in an alternate SMT8 mode, resources may be assigned for physical threads '0', '4', '1', '5' of thread set '0' and physical threads '2', '6', '3', '7' of thread set '1'. It should be appreciated that a wide variety of other resource assignments may be implemented in conformance with the disclosed techniques.

An exemplary processor core may begin assigning logical threads to physical threads (e.g., one logical thread may be assigned to a physical thread each cycle) when logical threads are mapped to a thread set of an IFU. While it is possible to map multiple logical threads to multiple physical threads each cycle, mapping multiple logical threads to multiple physical threads each cycle requires additional logic and does not usually provide a significant benefit. When a logical thread becomes inactive, resources assigned to the inactive logical thread may be reassigned to another logical thread. For example, when a logical thread completes and another logical thread starts up in a same SMT mode, resources assigned to the completed logical thread may be reassigned to the new logical thread that starts up. That is, resources assigned to a retired logical thread may be utilized by another logical thread.

For example, if a processor core is in SMT4 mode and logical threads '0' and '2' are assigned to thread set '0' (e.g., mapped to physical threads '0' and '1', respectively) and logical threads '3' and '4' are assigned to thread set '1' (e.g., mapped to physical threads '4' and '5', respectively) and logical thread '0' becomes inactive, new logical thread '5' may be assigned to thread set '0' and mapped to physical thread '0'. In various embodiments, when there is an SMT mode change to a lower SMT mode, threads are reassigned as only certain physical threads are valid in the lower SMT modes. In general, on any SMT mode change to a lower SMT mode logical threads are remapped.

It should be appreciated that a rebalance event may also result in reassigning logical threads to physical threads. For example, a rebalance event may be initiated when there are more logical threads on one thread set (e.g., two or more physical threads) for some period of time (e.g., 10 uS). In this case, during a rebalance logical threads may be flushed and reassigned to thread sets to balance the thread sets.

In summary, employing the disclosed logical-to-physical thread mapping facilitates splitting fixed IFU resources of a processor core between logical threads using only a physical thread number and the SMT mode. In general, the disclosed techniques reduce the complexity of managing IFU resources. The disclosed logical-to-physical thread mapping techniques advantageously facilitate: dividing resources that are partitioned based on the SMT mode in such a way that a physical thread and an SMT mode may be used to identify which partitioned resource should be used by a logical thread; changing from a lower SMT mode to a higher SMT mode (e.g., from SMT1 mode to SMT2 mode) while changing partitioned IFU resources without reassigning a logical thread, which is desirable since the software is not impacted; and moving a logical thread from one thread set to another thread set to rebalance thread sets when one thread set has too many threads.

With reference to FIG. 1, an exemplary data processing environment 100 is illustrated that includes a simultaneous multithreading (SMT) data processing system 110 that is configured, according to one or more embodiments of the present disclosure, to map logical threads to physical threads. Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
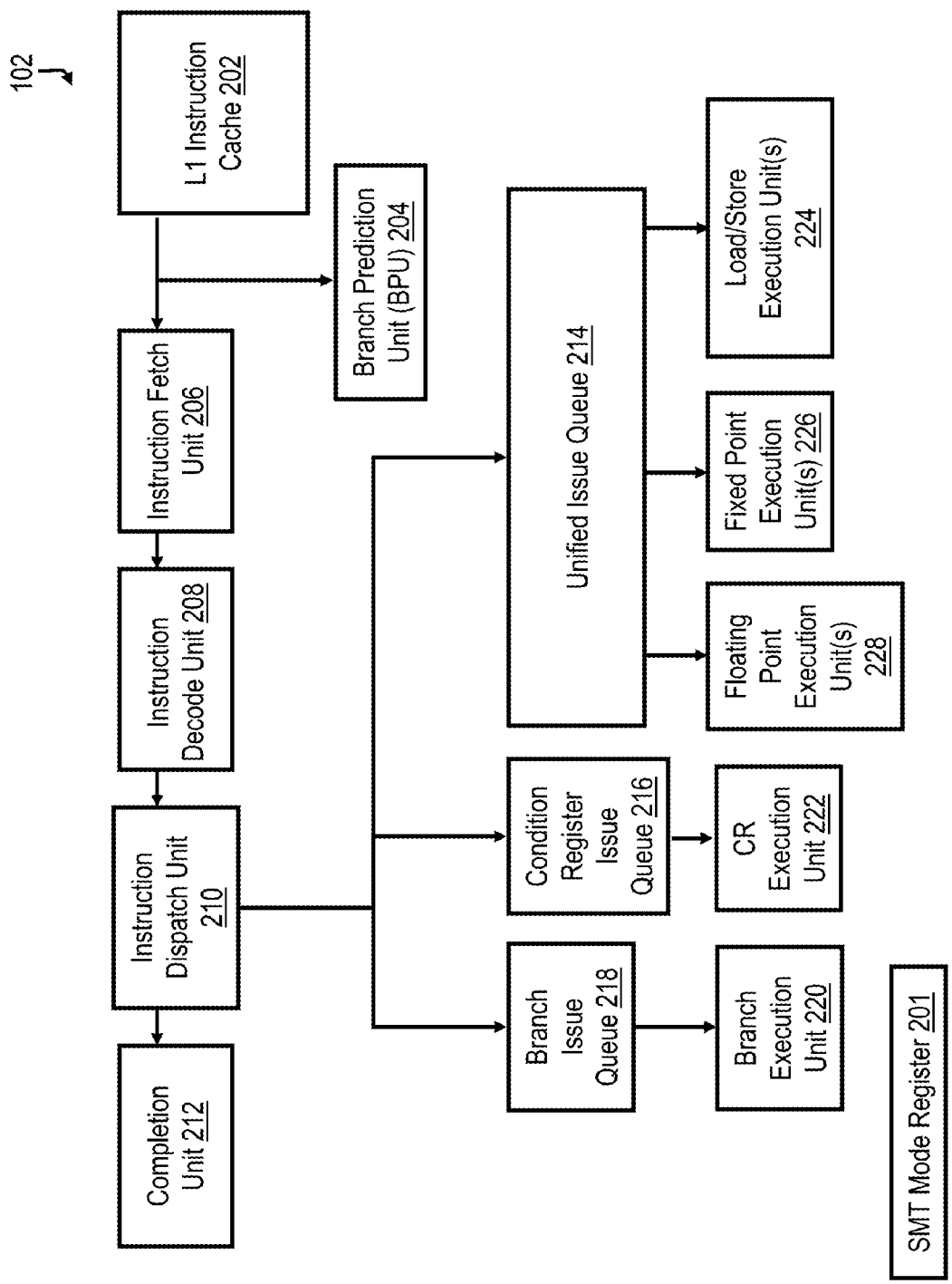
FIG. 2 is a diagram of a relevant portion of a processor pipeline of the data processing system of FIG. 1.

With reference to FIG. 2, relevant components of processor 102 are illustrated in additional detail. Processor 102 includes a level 1 (L1) instruction cache 202 from which instruction fetch unit (IFU) 206 fetches instructions. IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction fetch address register (IFAR). The GBHT and GSEL arrays may be indexed by the instruction fetch address hashed with a global history vector (GHV) (e.g., a 21-bit GHV reduced down to eleven bits, which provides one bit per allowed thread). The value in the GSEL may be employed to select between the LBHT and GBHT arrays for the direction of the prediction of each individual branch.

IFU 206 provides fetched instruction to instruction decode unit (IDU) 208 for decoding. IDU 208 provides decoded instructions to instruction dispatch unit 210 for dispatch. Following execution of dispatched instructions, instruction dispatch unit 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. Branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units. Processor 102 also includes an SMT mode register 201 whose bits may be modified by hardware or software (e.g., an operating systems (OS).

Figure 4:
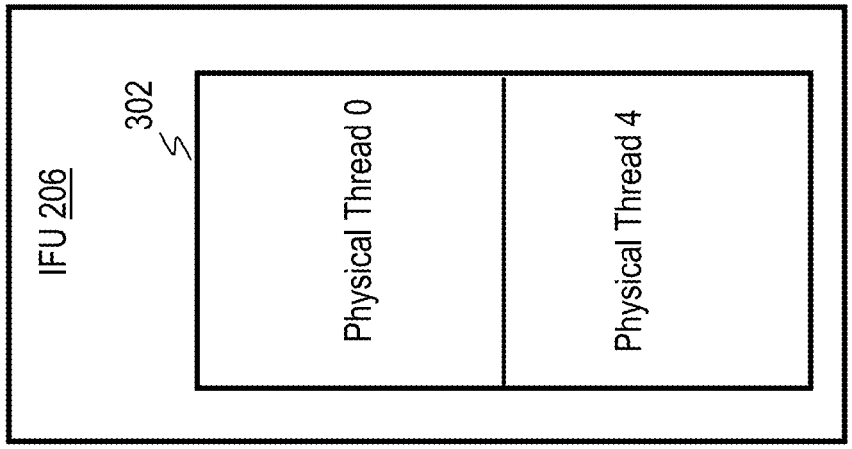
FIG. 4 is a diagram of a relevant portion of an IFU whose resources have been mapped for a second SMT (SMT2) mode that may include up to two logical threads mapped to two physical threads according to an embodiment of the present disclosure.

With reference to FIG. 3, resource 302 of IFU 206 is illustrated as being configured in a first SMT (SMT1) mode, in which a logical thread is mapped to physical thread '0'. With reference to FIG. 4, resource 302 of IFU 206 is illustrated as being configured in a second SMT (SMT2) mode, in which a first logical thread for a thread set '0' is mapped to physical thread '0' and a first logical thread for thread set '1' is mapped to physical thread '4'.

Figure 5:
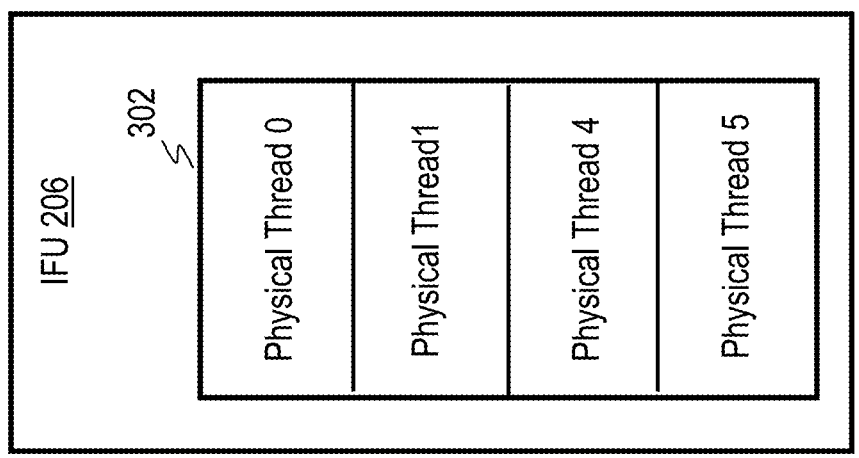
FIG. 5 is a diagram of a relevant portion of an IFU whose resources have been mapped for a third SMT (SMT4) mode that may include up to four logical threads mapped to four physical threads according to an embodiment of the present disclosure.

With reference to FIG. 5, resource 302 of IFU 206 is illustrated as being configured in a third SMT (SMT4) mode, in which a first logical thread for a thread set '0' is mapped to physical thread '0', a second logical thread for the thread set '0' is mapped to physical thread '1', a first logical thread for thread set '1' is mapped to physical thread '4', and a second logical thread for thread set '1' is mapped to physical thread '5'.

Figure 6:
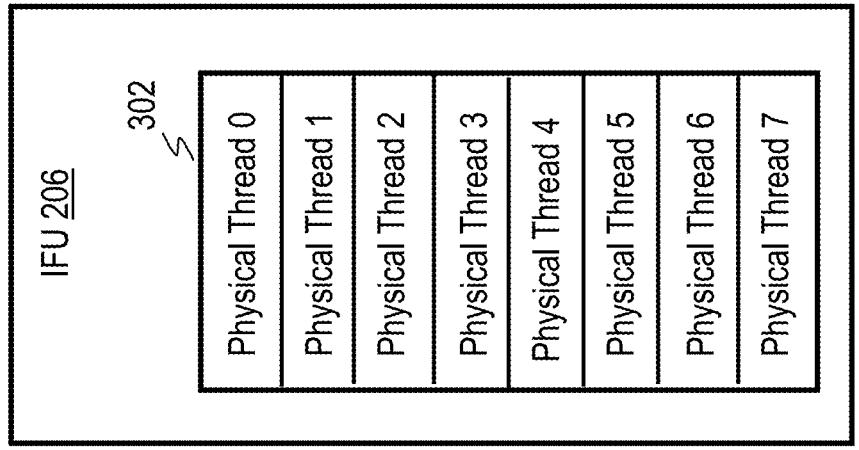
FIG. 6 is a diagram of a relevant portion of an IFU whose resources have been mapped for a fourth SMT (SMT8) mode that may include up to eight logical threads mapped to eight physical threads according to an embodiment of the present disclosure.

With reference to FIG. 6, resource 302 of IFU 206 is illustrated as being configured in a fourth SMT (SMT8) mode, in which: a first logical thread for a thread set '0' is mapped to physical thread '0'; a second logical thread for the thread set '0' is mapped to physical thread '1'; a third logical thread for thread set '0' is mapped to physical thread '2'; a fourth logical thread for thread set '0' is mapped to physical thread '3'; a first logical thread for a thread set '1' is mapped to physical thread '4'; a second logical thread for the thread set '1' is mapped to physical thread '5'; a third logical thread for thread set '1' is mapped to physical thread '6', and a fourth logical thread for thread set '1' is mapped to physical thread '7'. It should be appreciated that resource 302 of FIGS. 3-6 may correspond to a number of different resources (e.g., instruction buffers, effective address tables (EATs), link stacks, etc.) of IFU 206 or resources of a different functional unit.

Figure 7:
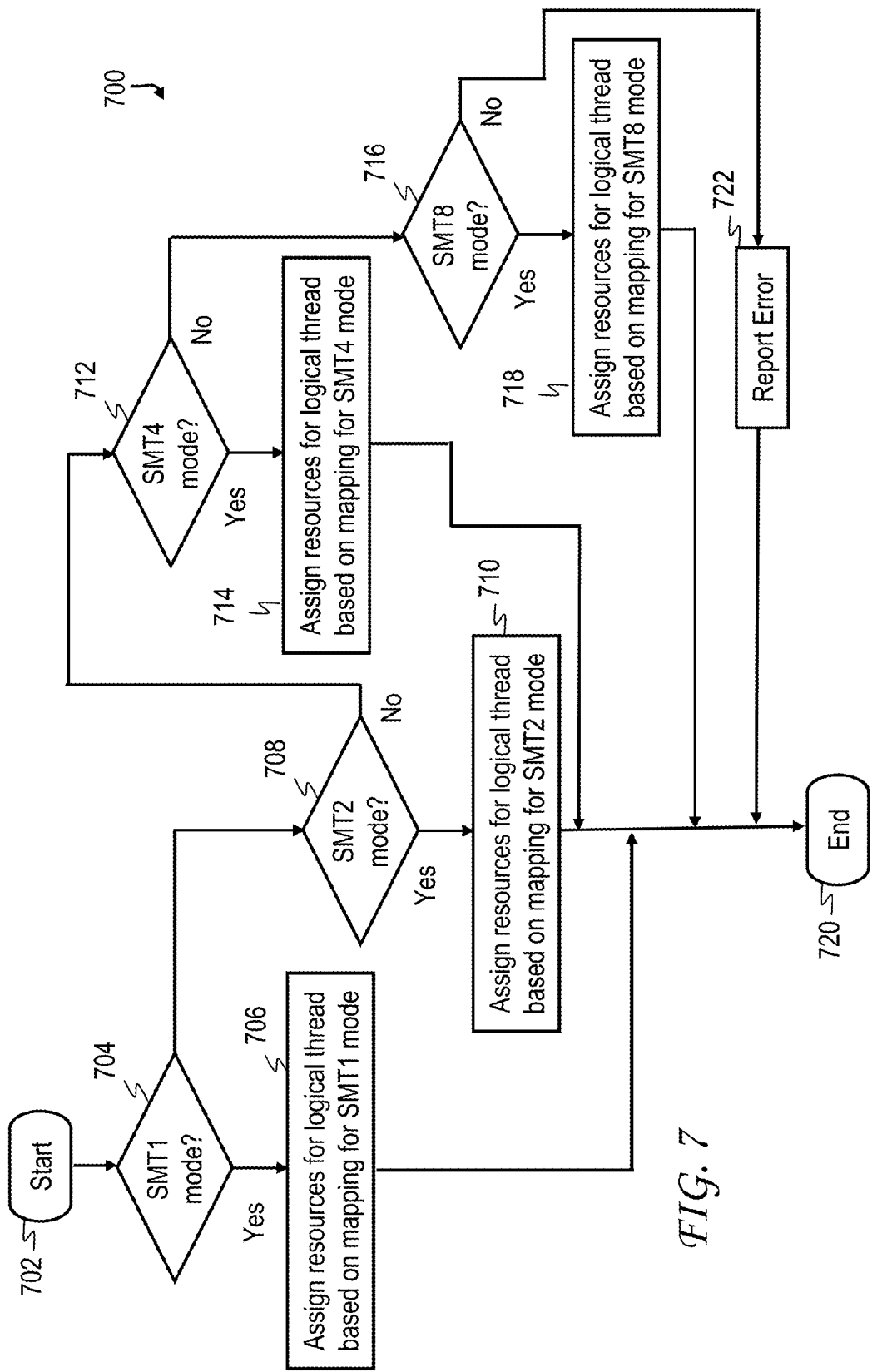
FIG. 7 is a flowchart of an exemplary process for assigning resources for logical threads based on a mapping for an SMT mode according to one embodiment of the present disclosure.

With reference to FIG. 7, an exemplary process 700 for mapping logical threads to physical threads based on a selected SMT mode for a processor is illustrated. Process 700 is initiated in block 702 in response to, for example, processor 102 determining that a logical thread requires mapping to a physical thread. Next, in decision block 704 processor 102 determines whether the SMT1 mode is indicated, e.g., by bits in SMT mode register 201 of processor 102. In response to the SMT1 mode being indicated in block 704, control transfers to block 706. In block 706 processor 102 assigns resources for the logical thread based on a mapping for the SMT1 mode. As is illustrated in FIG. 3, all of resource 302 is assigned to physical thread '0' (which maps to the logical thread). Following block 706 control transfers to block 720, where process 700 terminates until a next logical thread requires assignment to a physical thread. In response to the SMT1 mode not being indicated in block 704, control transfers to decision block 708.

In block 708 processor 102 determines whether the SMT2 mode is indicated. In response to the SMT2 mode being indicated in block 708, control transfers to block 710. In block 710 processor 102 assigns resources for the logical thread based on a mapping for the SMT2 mode and a thread set to which the logical thread is associated. As is illustrated in FIG. 4, a portion of resource 302 is assigned to physical thread '0' (which is in thread set '0') and a portion of resource 302 is assigned to physical thread '4' (which is in thread set '1'). Following block 710 control transfers to block 720, where process 700 terminates until a next logical thread requires assignment to a physical thread. In response to the SMT2 mode not being indicated in block 708, control transfers to decision block 712.

In block 712 processor 102 determines whether the SMT4 mode is indicated. In response to the SMT4 mode being indicated in block 712, control transfers to block 714. In block 714 processor 102 assigns resources for the logical thread based on a mapping for the SMT4 mode and a thread set to which the logical thread is associated. As is illustrated in FIG. 5, a first portion of resource 302 is assigned to physical thread '0' (which is in thread set '0'), a second portion of resource 302 is assigned to physical thread '1' (which is in thread set '0'), a third portion of resource 302 is assigned to physical thread '4' (which is in thread set '1') and a fourth portion of resource 302 is assigned to physical thread '5' (which is in thread set '1'). Following block 714 control transfers to block 720, where process 700 terminates until a next logical thread requires assignment to a physical thread. In response to the SMT4 mode not being indicated in block 712, control transfers to decision block 716.

In block 716 processor 102 determines whether the SMT8 mode is indicated. In response to the SMT8 mode being indicated in block 716, control transfers to block 718. In block 718 processor 102 assigns resources for the logical thread based on a mapping for the SMT8 mode and a thread set to which the logical thread is associated. As is illustrated in FIG. 6, a first portion of resource 302 is assigned to physical thread '0' (which is in thread set '0'), a second portion of resource 302 is assigned to physical thread '1' (which is in thread set '0'), a third portion of resource 302 is assigned to physical thread '2' (which is in thread set '0'), and a fourth portion of resource 302 is assigned to physical thread '3' (which is in thread set '0').

Additionally, a fifth portion of resource 302 is assigned to physical thread '4' (which is in thread set '1'), a sixth portion of resource 302 is assigned to physical thread '5' (which is in thread set '1'), a seventh portion of resource 302 is assigned to physical thread '6' (which is in thread set '1'), and an eighth portion of resource 302 is assigned to physical thread '7' (which is in thread set '1'). Following block 718 control transfers to block 720, where process 700 terminates until a next logical thread requires assignment to a physical thread. In response to the SMT8 mode not being indicated in block 716, control transfers to block 722 where an error is reported and then to block 720.

Accordingly, techniques have been disclosed herein that advantageously map logical threads to physical threads based on a selected SMT mode and a thread set for a processor.

In the flow charts above, the methods depicted in FIG. 7 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of mapping logical threads to physical threads of a simultaneous multithreading (SMT) data processing system, comprising:
   selecting an SMT mode for a processor;
   mapping one or more logical threads to one or more physical threads based on the selected SMT mode for the processor, wherein respective resources for each of the one or more physical threads are fixed based on the SMT mode and an identifier of the one or more physical threads, and wherein the processor is configured to execute two thread sets and the respective resources are located within an instruction fetch unit; and
   executing the one or more physical threads on the processor utilizing the respective resources.

2. The method of claim 1, wherein the SMT mode is an SMT1 mode where only physical thread zero is defined.

3. The method of claim 1, wherein the SMT mode is an SMT2 mode where physical thread zero is defined for thread set zero and physical thread four is defined for thread set one, and wherein a first logical thread for the thread set zero is assigned to physical thread zero and a first logical thread for the thread set one is assigned to physical thread four.

4. The method of claim 1, wherein the SMT mode is an SMT4 mode where physical threads zero and one are defined for thread set zero and physical threads four and five are defined for thread set one, and wherein a first logical thread for the thread set zero is assigned to physical thread zero, a second logical thread for the thread set zero is assigned to physical thread one, a first logical thread for the thread set one is assigned to physical thread four, and a second logical thread for the thread set one is assigned to physical thread five.

5. The method of claim 1, wherein the SMT mode is an SMT8 mode where physical threads zero, one, two, and three are defined for thread set zero and physical threads four, five, six, and seven are defined for thread set one, and wherein a first logical thread for the thread set zero is assigned to physical thread zero, a second logical thread for the thread set zero is assigned to physical thread one, a third logical thread for the thread set zero is assigned to physical thread two, a fourth logical thread for the thread set zero is assigned to physical thread three, a first logical thread for the thread set one is assigned to physical thread four, a second logical thread for the thread set one is assigned to physical thread five, a third logical thread for the thread set one is assigned to physical thread six, and a fourth logical thread for the thread set one is assigned to physical thread seven.

6. The method of claim 1, further comprising:
   changing the selected SMT mode from a lower SMT mode to a higher SMT mode without reassigning mapped logical threads to different physical threads.

7. The method of claim 1, wherein the respective resources are partitioned based on the selected SMT mode and assigned physical thread.

8. A processor, comprising:
   a memory; and
   multiple processor cores coupled to the memory, wherein the processor is configured to:
   select a simultaneous multithreading (SMT) mode;
   map one or more logical threads to one or more physical threads based on the selected SMT mode for the processor, wherein respective resources for each of the one or more physical threads are fixed based on the SMT mode and an identifier of the one or more physical threads, and wherein the processor is configured to execute two thread sets and the respective resources are located within an instruction fetch unit; and
   execute the one or more physical threads on the processor utilizing the respective resources.

9. The processor of claim 8, wherein the SMT mode is an SMT1 mode where only physical thread zero is defined.

10. The processor of claim 8, wherein the SMT mode is an SMT2 mode where physical thread zero is defined for thread set zero and physical thread four is defined for thread set one, and wherein a first logical thread for the thread set zero is assigned to physical thread zero and a first logical thread for the thread set one is assigned to physical thread four.

11. The processor of claim 8, wherein the SMT mode is an SMT4 mode where physical threads zero and one are defined for thread set zero and physical threads four and five are defined for thread set one, and wherein a first logical thread for the thread set zero is assigned to physical thread zero, a second logical thread for the thread set zero is assigned to physical thread one, a first logical thread for the thread set one is assigned to physical thread four, and a second logical thread for the thread set one is assigned to physical thread five.

12. The processor of claim 8, wherein the SMT mode is an SMT8 mode where physical threads zero, one, two, and three are defined for thread set zero and physical threads four, five, six, and seven are defined for thread set one, and wherein a first logical thread for the thread set zero is assigned to physical thread zero, a second logical thread for the thread set zero is assigned to physical thread one, a third logical thread for the thread set zero is assigned to physical thread two, a fourth logical thread for the thread set zero is assigned to physical thread three, a first logical thread for the thread set one is assigned to physical thread four, a second logical thread for the thread set one is assigned to physical thread five, a third logical thread for the thread set one is assigned to physical thread six, and a fourth logical thread for the thread set one is assigned to physical thread seven.

13. The processor of claim 8, further comprising:
   changing the selected SMT mode from a lower SMT mode to a higher SMT mode without reassigning mapped logical threads to different physical threads.

14. The processor of claim 8, wherein the respective resources are partitioned based on the selected SMT mode and assigned physical thread.

15. A data processing system, comprising:
   a data storage subsystem; and
   a processor coupled to the data storage subsystem, wherein the processor is configured to:
   select a simultaneous multithreading (SMT) mode;
   map one or more logical threads to one or more physical threads based on the selected SMT mode for the processor, wherein respective resources for each of the one or more physical threads are fixed based on the SMT mode and an identifier of the one or more physical threads, and wherein the processor is configured to execute two thread sets and the respective resources are located within an instruction fetch unit; and
   execute the one or more physical threads on the processor utilizing the respective resources.

16. The data processing system of claim 15, wherein the SMT mode is an SMT1 mode where only physical thread zero is defined.

17. The data processing system of claim 15, wherein the SMT mode is an SMT2 mode where physical thread zero is defined for thread set zero and physical thread four is defined for thread set one, and wherein a first logical thread for the thread set zero is assigned to physical thread zero and a first logical thread for the thread set one is assigned to physical thread four.

18. The data processing system of claim 15, wherein the SMT mode is an SMT4 mode where physical threads zero and one are defined for thread set zero and physical threads four and five are defined for thread set one, and wherein a first logical thread for the thread set zero is assigned to physical thread zero, a second logical thread for the thread set zero is assigned to physical thread one, a first logical thread for the thread set one is assigned to physical thread four, and a second logical thread for the thread set one is assigned to physical thread five.

19. The data processing system of claim 15, wherein the SMT mode is an SMT8 mode where physical threads zero, one, two, and three are defined for thread set zero and physical threads four, five, six, and seven are defined for thread set one, and wherein a first logical thread for the thread set zero is assigned to physical thread zero, a second logical thread for the thread set zero is assigned to physical thread one, a third logical thread for the thread set zero is assigned to physical thread two, a fourth logical thread for the thread set zero is assigned to physical thread three, a first logical thread for the thread set one is assigned to physical thread four, a second logical thread for the thread set one is assigned to physical thread five, a third logical thread for the thread set one is assigned to physical thread six, and a fourth logical thread for the thread set one is assigned to physical thread seven.

20. The data processing system of claim 15, wherein the respective resources include one or more instruction buffers, effective address tables (EATs), and link stacks of an instruction fetch unit.

\* \* \* \* \*